May 28, 1963 J. O. HRUBY, JR 3,091,398
LAWN SPRINKLER WITH GYRATORY STEM
Filed April 12, 1962
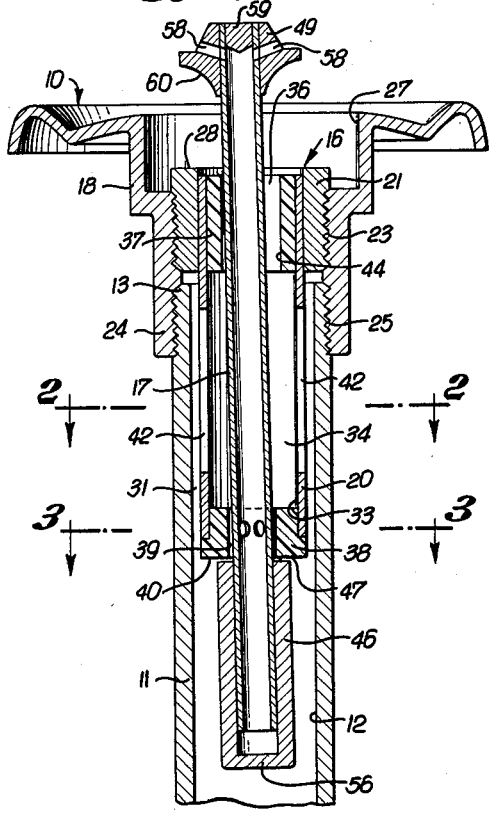
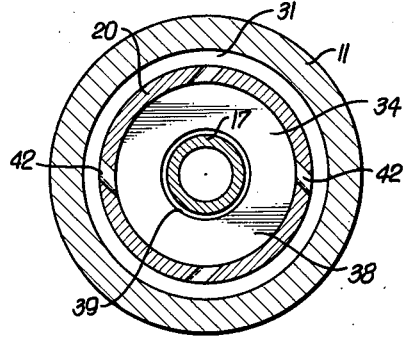
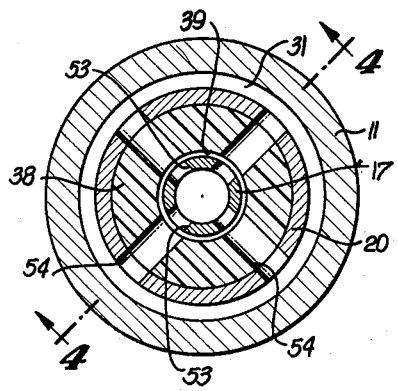
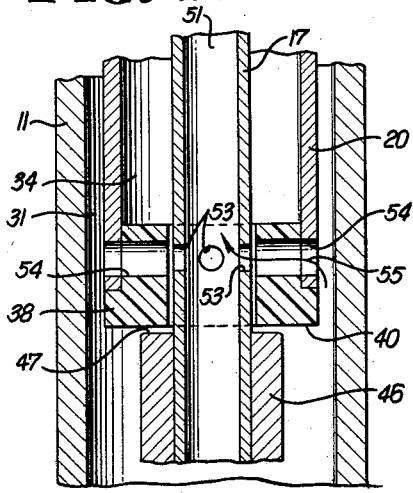
JOHN O. HRUBY, JR.
INVENTOR.
BY BEEHLER & SHANAHAN
J. M. Dubiel
ATTORNEYS United States Patent Office 3,091,398
Patented May 28, 1963

3,091,398
LAWN SPRINKLER WITH GYRATORY STEM
John O. Hruby, Jr., Burbank, Calif., assignor, by mesne assignments, to Rain Jet Corp., Burbank, Calif., a corporation of California
Filed Apr. 12, 1962, Ser. No. 187,130
4 Claims. (Cl. 239—206)

This invention relates to lawn sprinklers of the character disclosed in Letters Patent of the United States, Nos. 2,589,942, 2,639,191, and 2,954,171, issued on March 18, 1952, May 19, 1953, and September 27, 1960, respectively, and my copending application Serial No. 37,497, now Patent No. 3,034,728.

This application is a continuation-in-part of my copending application filed September 26, 1960, Serial No. 58,303, now abandoned.

Sprinkler of the general type described in said patents and in said pending applications are characterized by a stem disposed longitudinally in a sprinkler body and adapted to gyrate around in the body with the axis of the stem being inclined with respect to the axis of the body. In being gyrated, the stem is caused to roll along a surface of the sprinkler body with the result that the stem rotates on its axis.

In the case of a lawn sprinkler of said Patent No. 2,589,942, in which the gyratory stem is solid, there is a head upon the outer end of the stem which deflects water from a body discharge opening in a direction radially outward from the stem. Because of the inclination of the stem, the stem head deflects water from the body slightly upwardly from one side of the head and slightly downwardly from the other side of the head, thereby to evenly distribute the water over a wide area around the sprinkler.

In the case of lawn sprinklers of said Patent No. 2,639,191, the stem is tubular and has outlet orifices formed around the upper end portion thereof. The gyratory and rotary movement of the stem causes streams of water from the orifices to revolve around the sprinkler and to move outwardly toward the periphery of the area being sprayed and then inwardly from the periphery thereby to distribute water evenly over the lawn area.

According to the instant invention, the water distribution characteristics of lawn sprinklers of the above-mentioned gyratory stem type may be greatly improved by making the water inlet capacity of the sprinkler body substantially greater than the outlet capacity of the discharge opening of the sprinkler body. By restricting the water outlet from the sprinkler body to a size substantially less than the water inlet, water will be discharged from the sprinkler body with greater force than otherwise and thereby will be sprayed to a greater distance around the sprinkler. Also by the improvement of this invention a greater cushioning effect is derived for the stem in the region thereof where the stem rolls along a bearing surface in the sprinkler body. Furthermore, in lawn sprinklers of this invention, because the water is discharged from the sprinkler body with a relatively greater velocity, the water discharge from the sprinkler body will wash the critical region of stem to body contact free of sand or dirt particles which otherwise might get caught in this region and interfere with the gyratory motion of the stem.

In the case of lawn sprinklers of said Patent No. 2,954,171, in which the lower end portion of the sprinkler has sequentially registrable inlet openings in the stem and in the sprinkler body to produce a non-circular spray pattern, it has been found that the stem wears and, in time, breaks off in the region of its inlet openings. When such sprinklers are modified to incorporate the structure of the instant invention, it is found that the life of the sprinkler is increased many times, usually about forty or more times than that of such sprinklers without the improvement provided by this invention.

Further advantages of the invention will appear in the following part of this specification wherein the details of construction and mode of operation of a preferred embodiment are described with reference to the accompanying drawing, in which:

FIG. 1 is a central vertical section through a sprinkler embodying this invention;

FIGS. 2 and 3 are enlarged cross-sections taken along line 2—2 and 3—3, respectively, on FIG. 1; and, FIG. 4 is a detail section taken upon a plane indicated by line 4—4 on FIG. 3.

Referring to the drawing in detail, there is shown a sprinkler head embodying this invention, the head being designated generally by reference numeral 10 and being mounted atop a riser pipe 11 of a lawn sprinkler installation which supplies water to the sprinkler head. The inside surface of the riser pipe is designated by reference numeral 12, and the upper end of the pipe by numeral 13.

Sprinkler head 10 comprises a hollow body 16 extending axially into the upper end of the riser pipe, a rotatable stem 17 in the body, and a casting 18 for mounting the body upon the upper end of the riser pipe. The body 16 comprises a rigid tube 20 and a collar 21 around the tube, the tube being force-fitted or otherwise suitably secured in the collar. The collar is screw-threaded at 23 for securing the body 16 in the casting 18. The casting has a skirt portion 24 which is internally screw-threaded at 25 for mounting the sprinkler head on the riser. There is a recess 27 formed in the casting for positioning the body in the casting with the upper end surface 28 of the body spaced below the top surface of the casting.

The body 16 is of smaller outside diameter than the inside diameter of the riser to provide an annular space 31 around the body.

Numeral 33 designates the inside cylindrical surface of the body tube 20, such inside surface defining a body cavity or bore 34 in the sprinkler body. A water discharge opening 36 in the outer or upper end of the body is defined by a bearing tube 37 which is forced-fitted in the upper end portion of the tube 20. A bearing tube 38 is force-fitted in the lower or inner end of the body bore 34, the tube 38 having a cylindrical bore 39 extending axially therethrough. The lower end face of the bearing tube 38 defines the lower or inner end face 40 of the sprinkler body. The bearings 37 and 38 are shown as being formed of laminated phenolic composition.

Formed in the side walls of the body 16 is a plurality of apertures 42 for admitting water into the body cavity from the riser 11. These apertures are formed as narrow slits which extend longitudinally of the sprinkler body. There are four such slits in the illustrated embodiment, they being in a circumferentially arranged series and uniformly spaced apart. As best shown in FIG. 2, these slits extend through the body side wall at an angle with respect to the radii of the body cavity, thereby to cause water in the body cavity to spiral or rotate around and upwardly in the body cavity and out through the discharge opening 36.

Stem 17 is arranged longitudinally in the body cavity, the stem extending upwardly beyond the discharge opening 36 and downwardly through the lower end opening 39 of the body. The stem is substantially smaller in outside diameter than the discharge opening 36. The lower end opening 39 of the body is only slightly larger in diameter than the stem, enough so that the lower end opening 39 will accommodate rotation of the stem on its longitudinal axis and sufficient inclination of the stem with respect to the axis of the body cavity to permit engagement of the stem with the upper end of the inside wall surface 44 which defines the discharge opening 36.

A stop means in the form of a collar 46 is secured on the lower or inner end of the stem for preventing removal of the stem out through the discharge opening. The stem is moveable longitudinally in the body cavity whereby the illustrated embodiment is of the "pop-up" type lawn sprinkler, i.e., when water is turned on to the system, the stem moves upwardly to the position thereof shown in FIG. 1 because of the force of water flowing through the sprinkler head. The extent of upward movement of the stem in the body is limited by engagement of the upper end surface or shoulder 47 of the collar 46 against the lower annular end surface 40 of the sprinkler body.

A head 49 upon the upper end of the stem is larger in diameter than the discharge opening 36 whereby when water to the sprinkler is turned off, the stem will drop down in the body to a position in which the stem covers the discharge opening 36. In that position the stem head will be received in the recess 27 of the sprinkler casting 18 thereby to protect the head when in standby condition from being damaged by traffic over the lawn.

The stem 17 of the illustrated embodiment is similar to that of the sprinkler which is illustrated and described in Patent No. 2,954,171, the stem 17 being tubular. Reference numeral 51 designates its axial passage or bore. Water enters the stem through inlet ports 53 formed in the lower end portion of the stem above the collar 46. The lower end portion of the body 16 has ports 54 formed therein, extending radially through the body tube 20 and the bearing 38. The stem ports 53 are four in number and the body ports 54 are also four in number, the ports of each group being uniformly spaced apart in circumferentially arranged series. As the stem rotates on its axis, the stem ports 53 become axially aligned with the body ports 54 respectively (as illustrated in FIGS. 3 and 4), for flow of water from the riser 11 to within the stem 17 as indicated by arrow 55 in FIG. 4. The lower end of the tubular stem is closed by forming the collar 46 as a cup to provide an end closure 56, whereby the inlet for the stem is constituted solely of the ports 53.

The upper end of the stem has a plurality of orifices 58 which extend through the stem head 49, and a plug 59 for closing the upper end of the stem except for the orifices. Water passes upwardly in the stem and out through the orifices 58 in streams extending radially outward and slightly upward from the sprinkler head. Water from the cavity 34 is forced upward and out from the discharge opening 36 around the stem and against the undersurface 60 of the stem head 49 which deflects such water radially outward around the sprinkler.

A review of the explanation of the mode of operation of the sprinklers of the patents referred to above will make it clear that for the sprinkler head of the instant invention, the swirl of water around and upwardly in the body cavity 34, because of the slant of the water inlet slits 42, will cause the stem 17 to gyrate around in the body with the axis of the stem being inclined with respect to the axis of the body cavity 34. In being so gyrated, the stem contacts the surfaces which define the discharge opening 36 and the lower end opening 39 whereby the stem rolls along these surfaces and thus rotates on its axis.

The improvement provided by this invention resides in making the inlet capacity of the sprinkler body several times greater than the capacity of the discharge opening 36. More particularly, the total of the cross-sectional areas of the plurality of slits 42 should be greater than the discharge passage around the stem, i.e. the size of opening 36 less the cross-sectional size of the stem 17. A preferred range for the relative sizes of the combined inlet openings 42 and the effective outlet passageway at 36 is at least three to one. Optimum results are obtained when the ratio of inlet capacity to outlet capacity, measured in terms of opening sizes, is four to one. Also the slits should be uniformly spaced apart circumferentially of the body wall 20, and preferably should be at least three in number.

Comparative tests were run to demonstrate the much longer life of sprinklers embodying this invention. All of the tests described hereinafter were conducted on sprinklers of the same size and design, the only differences between the test specimens being in the sizes and number of slits 42. Except where otherwise indicated all test specimens had the following pertinent dimensions, with conventional manufacturing tolerances:

BODY 16

| | Inches |
|---|---|
| Inside diameter of bushing 37 | 0.312 |
| Inside diameter of body tube 20 | 0.418 |
| Wall thickness of body tube 20 | 0.040 |
| Length of each slit 42 | 0.900 |
| Diameter of each of four ports 54 | 0.125 |
| Width of each slit 42 | 0.028 |

STEM 17

| | Inches |
|---|---|
| Outside diameter of stem | 0.250 |
| Wall thickness of stem | 0.028 |
| Diameter of each four ports 53 | 0.110 |
| Diameter of each of four orifices 58 | 0.096 |

SLANT OF SLITS 42

Each slit was formed such that a plane parallel to a diameter of the body tube 20 and containing the longitudinal axis of the slit is spaced 0.090 inch from the diameter.

A pressure of the order of 25 p.s.i. (gage) is representative of the water pressures generally experienced for conventional lawn sprinkler systems; but to greatly accelerate the tests, water was supplied to the test specimens at a gage pressure of 100 p.s.i. The test specimens were inspected at intervals of from about 15 to 20 minutes and the time which transpired from the start of a test to the time of inspection when it was observed that the stem 17 of a sprinkler was broken at the place of its ports 53 was recorded. The following table shows the results of the tests:

I. *Sprinklers With Two Diametrically Opposite Slits 42, Each 0.900" Long by 0.028" Wide*

| Sprinkler No.: | Running time to stem breaking |
|---|---|
| 1 | 1 hour, 30 minutes. |
| 2 | 1 hour, 30 minutes. |
| 3 | 1 hour, 30 minutes. |
| 4 | 1 hour, 30 minutes. |
| 5 | 1 hour, 25 minutes. |
| 6 | 2 hours. |
| 7 | 2 hours, 40 minutes. |
| 8 | 2 hours, 5 minutes. |
| 9 | 2 hours, 5 minutes. |
| 10 | 2 hours, 5 minutes. |

II. *Sprinklers With Four Uniformly Spaced Apart Slits 42, Each 0.900" x 0.028"*

| Sprinkler No.: | Running time to stem breaking |
|---|---|
| 11 | 35 hours, 20 minutes. |
| 12 | 54 hours. |
| 13 | Not broken after 122 hours. |
| 14 | 47 hours, 35 minutes. |
| 15 | 57 hours, 5 minutes. |

III. *Sprinklers With Three Uniformly Spaced Apart (120°) Slits 42, Each 0.900" x 0.028"*

| Sprinkler No.: | Running time to stem breaking |
|---|---|
| 16 | 4 hours, 40 minutes. |
| 17 | 14 hours, 35 minutes. |

IV. Sprinklers With Two Diametrically Opposite Slits 42, Each 0.900" Long by 0.040" Wide

| Sprinkler No.: | Running time to stem breaking |
|---|---|
| 18 | 27 hours, 20 minutes. |
| 19 | 76 hours, 25 minutes. |
| 20 | 106 hours, 35 minutes. |

In Test IV the stems rotated relatively slowly.

V. Sprinklers With Two Diametrically Opposite Slits, Each 0.900" x 0.028", but Extent of Slant of Slits Greatly Reduced, i.e. 0.050" From Diameter as Compared With 0.090" for Tests I to IV Inclusive

| Sprinkler No.: | Running time to stem breaking |
|---|---|
| 21 | 65 hours, 25 minutes. |
| 22 | 69 hours. |
| 23 | Not broken after 100 hours. |
| 24 | Not broken after 100 hours. |

In Test V the stems rotated relatively slowly with substantially less vibration.

VI. Sprinklers With Four Uniformly Spaced Apart Slits 42, Each 0.900" Long by 0.016"

| Sprinkler No.: | Running time to stem breaking |
|---|---|
| 25 | 24 hours, 25 minutes. |
| 26 | 25 hours, 30 minutes. |
| 27 | Not broken after 31 hours. |

Several different designs of sprinklers were compared as to internal pressure (within the body tube 20) with the water supply pressure being 25 p.s.i., and the following was observed:

(a) For sprinklers identical to those of Test I, the internal pressure was 17.5 p.s.i.
(b) For sprinklers identical with those of Test II, the internal pressure was 22.5 p.s.i.
(c) For sprinklers with four holes (0.052" in diameter) in the place of slits 42 (similar to Patent No. 2,639,191) the internal pressure was 8 p.s.i.

The results of the above tests demonstrate what should normally be expected, i.e. when the slant of the slits is decreased as in Test V or when the width of the slits is substantially increased as in Test IV thereby decreasing the effect of slit slant, the stem has increased life though less power for stem rotation. However, an unexpected result is the great increase in life resulting from increasing the number of slits while maintaining speed of rotation. More particularly, the life of the sprinkler is strikingly increased and high rotation speed maintained by increasing the number of slits preferably to four and spacing them uniformly apart circumferentially of the spindle body.

When the sprinklers are used in conventional lawn sprinkler systems with water supply at about 25 p.s.i., it is found that sprinklers of the type used in Test I (two slits) last for months before breaking, but no breaking of stems has yet been reported in the cases of sprinklers of the type used in Test II (four slits).

Sprinklers of the type used in Test II (four slits) cause the water from the sprinkler body to reach out to greater distances and produce more evenly distributed spray patterns than do those of the type used in Tests I and IV.

It is preferred to form the aperture 42 as narrow slits as described above because wide slits impart but slight rotation to water in the sprinkler body and furthermore the narrower slit provides a filter preventing entrance of relatively large sized dirt and sand particles.

While the instant invention has been shown and described herein in what is conceived to be the most practical and preferred embodiment, it is recognized that departures may be made therefrom within the scope of the invention which is therefore not to be limited to the details disclosed herein but is to be accorded the full scope of the appended claims.

Having described the invention, what is claimed as new in support of Letters Patent is:

1. A lawn sprinkler comprising a body adapted to be mounted atop a water supply riser, the body having an upper end and a lower end and an inside surface defining a cavity formed therein, the body having an upper end opening for discharge of water from said cavity, a stem arranged longitudinally in the cavity and extending upwardly beyond said discharge opening, means on the lower end portion of the stem engageable with said body for preventing removal of the stem out through said discharge opening, the stem being rotatable on its axis and gyratable around in the cavity with the axis of the stem being inclined with respect to the vertical axis of the cavity, a head on the upper end portion of the stem for deflecting water from said discharge opening radially outward from the stem, the body having a plurality of slits formed in the side wall thereof for flow of fluid from said riser into the body cavity, said slits being inclined with respect to the radii of the body to impart rotary motion to fluid within the body thereby to gyrate the stem within the body, said cavity and said discharge opening being of larger diameter than the outside diameter of said stem, the total of the slit sizes being at least three times greater than the difference between the size of said discharge opening and the cross-sectional area of that portion of said stem which is disposed in said discharge opening, whereby the inlet capacity to said cavity is greater than its outlet capacity, and the slits being at least three in number and spaced apart uniformly around the sprinkler body.

2. A lawn sprinkler according to claim 1 in which said slits are four in number.

3. A lawn sprinkler according to claim 1 in which said stem is tubular and has an inlet opening formed therein in the lower end portion thereof and an outlet orifice formed in the upper end portion thereof.

4. A lawn sprinkler according to claim 3 in which said body has a radially extending inlet opening registrable with the inlet opening of said stem.

References Cited in the file of this patent

UNITED STATES PATENTS

| | | |
|---|---|---|
| 2,954,171 | Hruby | Sept. 27, 1960 |